(12) United States Patent
Bae et al.

(10) Patent No.: US 8,288,060 B2
(45) Date of Patent: Oct. 16, 2012

(54) METAL-SUPPORTED SOLID OXIDE FUEL CELL AND MANUFACTURING METHOD THEREOF

(75) Inventors: Joongmyeon Bae, Daejeon (KR); Seung-Wook Baek, Daejeon (KR); Changbo Lee, Daejeon (KR); Gyujong Bae, Daejeon (KR); Jaehwa Jeong, Daejeon (KR); Yu-Mi Kim, Daejeon (KR)

(73) Assignee: Korea Advanced Instutute of Science and Technology, Daejeon (KR)

( * ) Notice: Subject to any disclaimer, the term of this patent is extended or adjusted under 35 U.S.C. 154(b) by 842 days.

(21) Appl. No.: 12/412,243

(22) Filed: Mar. 26, 2009

(65) Prior Publication Data
US 2010/0062303 A1    Mar. 11, 2010

(30) Foreign Application Priority Data
Sep. 8, 2008 (KR) .................. 10-2008-0088069

(51) Int. Cl.
*H01M 8/02* (2006.01)
*H01M 8/12* (2006.01)
*H01M 8/24* (2006.01)
(52) U.S. Cl. ...................... 429/535; 429/465
(58) Field of Classification Search .......... 429/457, 429/535, 465
See application file for complete search history.

(56) References Cited

U.S. PATENT DOCUMENTS

| | | | |
|---|---|---|---|
| 6,007,933 A * | 12/1999 | Jones | 429/535 X |
| 7,150,931 B1 * | 12/2006 | Jaffrey | 429/465 |

* cited by examiner

*Primary Examiner* — Stephen J. Kalafut
(74) *Attorney, Agent, or Firm* — Christie, Parker & Hale, LLP

(57) ABSTRACT

Disclosed are a metal-supported solid oxide fuel cell and a method for manufacturing the metal-supported solid oxide fuel cell. The method includes: fixedly joining a metal support to one surface of a unit cell including a fuel electrode, an air electrode and an electrolyte layer interposed between the fuel and air electrodes to fabricate a metal-supported unit cell (S210); fixing a first separator to the surface of the metal support opposite to the surface thereof to which the unit cell is joined (S220); and assembling the first separator to which the metal-supported unit cell is fixed, an insulating member, a first current collecting member and a second separator (S230). In the metal-supported solid oxide fuel cell, the metal support having a hollow portion in place of a mesh type current collector can be securely sealed to the first separator by direct welding to allow the fuel gas and air to be supplied to the unit cell through respective defined flow passages without being mixed or leakage. Due to this construction, the metal-supported solid oxide fuel cell is stable and has high energy production efficiency. Furthermore, the metal-supported solid oxide fuel cell has sufficient mechanical strength, resulting in improved durability and extended service life.

12 Claims, 7 Drawing Sheets

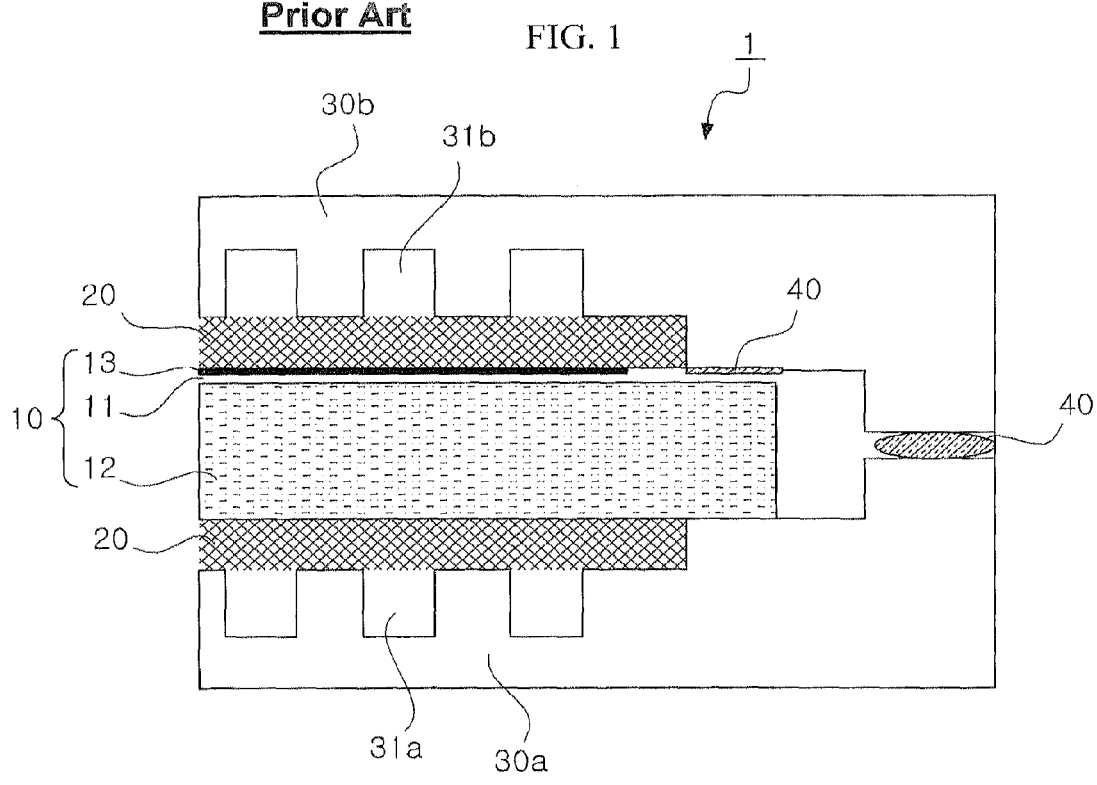
Prior Art FIG. 1
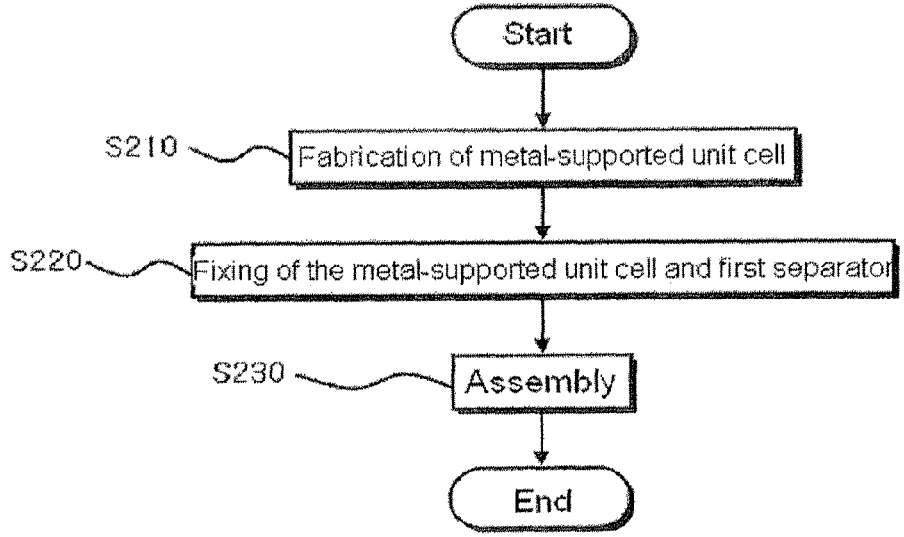
FIG. 2

FIG. 6
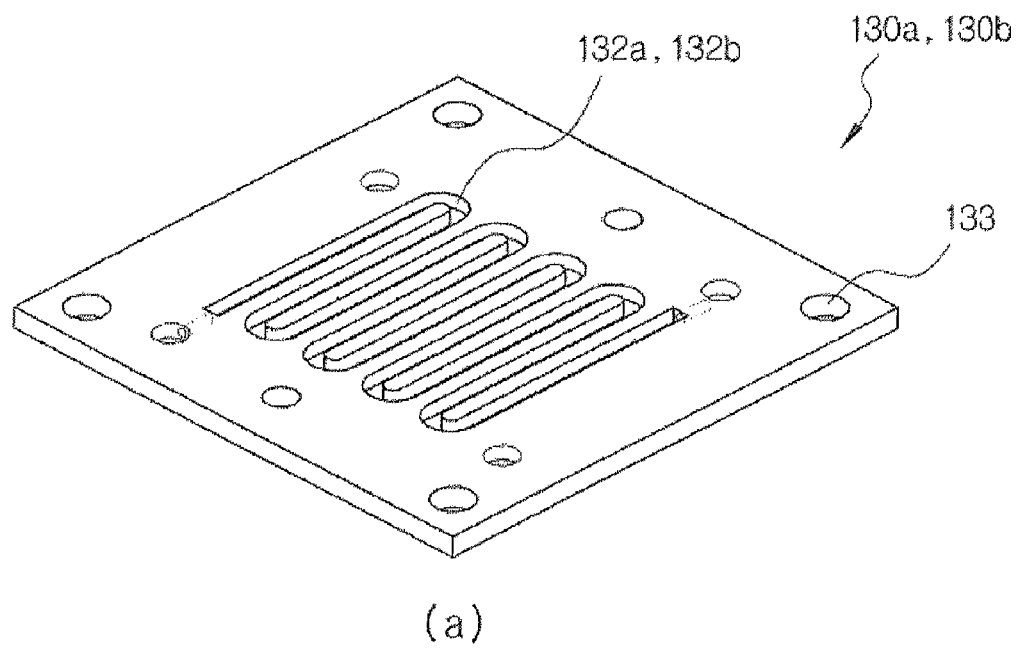
(a)
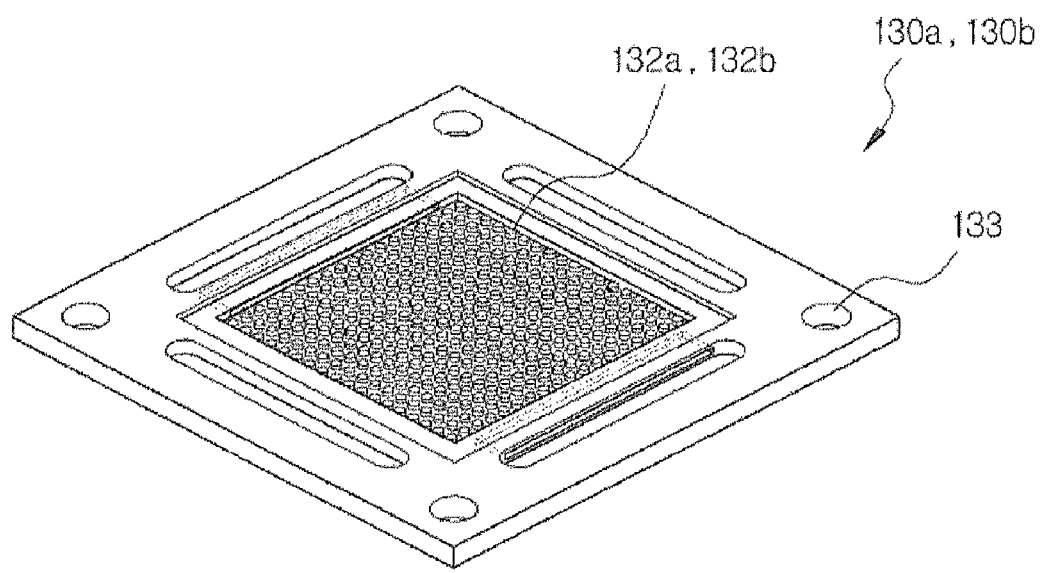
(b)

METAL-SUPPORTED SOLID OXIDE FUEL CELL AND MANUFACTURING METHOD THEREOF

CROSS-REFERENCE TO RELATED APPLICATION

This application claims priority to and the benefit of Korean Patent Application No. 10-2008-0088069, filed on Sep. 8, 2008, in the Korean Intellectual Property Office, the entire content of which is incorporated herein by reference.

CROSS-REFERENCE TO RELATED APPLICATIONS

This application claims priority to and the benefit of Korean Patent Application No. 10-2008-0088069, filed on Sep. 8, 2008, in the Korean Intellectual Property Office, the entire content of which is incorporated herein by reference.

BACKGROUND OF THE INVENTION

1. Field of the Invention

The present invention relates to a metal-supported solid oxide fuel cell and a manufacturing method thereof. More specifically, the present invention relates to a metal-supported solid oxide fuel cell with markedly improved durability and sealing efficiency in which a metal-supported unit cell can be securely sealed to a separator by welding to prevent leakage or mixing of a fuel gas and air prior to reactions in the unit cell and in which the fuel gas and air are supplied through respective defined flow passages to achieve high energy production efficiency, and a method for manufacturing the metal-supported solid oxide fuel cell.

2. Description of the Related Art

Fuel cells are devices that directly convert chemical energy produced by oxidation of fuel into electrical energy. Fuel cells are new environmentally friendly future energy technologies that generate electrical energy from abundant substances such as hydrogen and oxygen on the earth.

A typical fuel cell includes an air electrode as a cathode to which oxygen is supplied and a fuel electrode as an anode to which hydrogen is supplied. In the fuel cell, the oxygen and the hydrogen undergo electrochemical reactions as reverse reactions of water electrolysis to generate electricity, heat and water. As a result, the fuel cell produces electrical energy with high efficiency without causing environmental pollution.

Such fuel cells are free from the limitations of the Carnot cycle, which acts as a factor limiting the efficiency of conventional heat engines, resulting in a 40% or higher increase in efficiency. Fuel cells discharge water only, posing no risk of environmental pollution. Further, fuel cells possess many advantages of size reduction and no noise production because they include no mechanically moving parts, unlike conventional heat engines. Based on these advantages, much research on fuel cell technologies is actively underway.

Fuel cells are classified into phosphoric acid fuel cells (PAFCs), molten carbonate fuel cells (MCFCs), solid oxide fuel cells (SOFCs), polymer electrolyte membrane fuel cells (PEMFCs), direct methanol fuel cells (DMFCs) and alkaline fuel cells (AFCs) by the kind of electrolyte that they employ. The six types of fuel cells are available or are currently being developed in the art. The characteristics of the respective fuel cells are summarized in the following table.

TABLE 1

| Type | PAFC | MCFC | SOFC | PEMFC | DMFC | AFC |
|---|---|---|---|---|---|---|
| Electrolyte | Phosphoric acid | Lithium carbonate/ potassium carbonate | Zirconia/ceria-based | Hydrogen ion exchange membrane | Hydrogen ion exchange membrane | Potassium hydroxide |
| Ion conductor | Hydrogen ion | Carbonate ion | Oxygen ion | Hydrogen ion | Hydrogen ion | Hydrogen ion |
| Operation temp. (°C.) | 200 | 650 | 500-1,000 | <100 | <100 | <100 |
| Fuel | Hydrogen | Hydrogen/carbon monoxide | Hydrogen, hydrocarbon, carbon monoxide | Hydrogen | Methanol | Hydrogen |
| Fuel material | City gas, LPG | City gas, LPG, coal | City gas, LPG, hydrogen | Methanol, methane, gasoline, hydrogen | Methanol | Hydrogen |
| Efficiency (%) | 40 | 45 | 45 | 45 | 30 | 40 |
| Output range (W) | 100-5,000 | 1,000-1,000,000 | 100-100,000 | 1-10,000 | 1-100 | 1-100 |
| Application | Distributed power generation | Large scale power generation | Small/middle/large scale power generation | Power source for transportation | Portable power source | Power source for spaceship |
| Development stage | Demonstrated- actually used | Tested- demonstrated | Tested- demonstrated | Tested- demonstrated | Tested- demonstrated | Applied to spaceship |

As can be known from the table, the fuel cells can be suitably selected according to the intended purpose taking into consideration their output ranges and applications. Of these, the solid oxide fuel cells (SOFCs) are advantageous in that it is relatively easy to control the position of electrolytes, there is no risk that electrolytes may be used up because the electrolytes are fixedly positioned, and the life of constituent materials is long due to the weak corrosiveness of electrolytes. Based on these advantages, the solid oxide fuel cells have drawn a great deal of attention for use in distributed power generators and in commercial and household applications.

According to the operational principle of a general solid oxide fuel cell, when oxygen is supplied to an air electrode and hydrogen is supplied to a fuel electrode, the following reactions occur in the respective electrodes.

Reaction in the fuel electrode (Anode): $2H_2 + 2O^{2-} \rightarrow 2H_2O + 4e^-$.

Reaction in the air electrode (Cathode): $O_2 + 4e^- \rightarrow 2O^{2-}$

The solid oxide fuel cell uses YSZ (yttria-stabilized zirconia) as an electrolyte, a Ni-YSZ cermet as a fuel electrode, a perovskite material as an air electrode, and oxygen ions as mobile ions.

FIG. 1 is a schematic view of a prior art solid oxide fuel cell 1. The solid oxide fuel cell 1 includes: a unit cell 10 including a fuel electrode 12, an air electrode 13, and an electrolyte layer 11 interposed between the fuel and air electrodes; current collectors 20 provided on both surfaces of the unit cell 10; and lower and upper separators 30a and 30b accommodating the unit cell 10 and the current collector 20 therein.

The separators 30a and 30b support the unit cell 10 and the current collectors 20. The separators 30a and 30b have supply passages 31a and 31b through which a fuel gas and air (oxygen) are supplied, respectively.

The fuel gas and air must flow in the solid oxide fuel cell 1 only through the defined passages. Mixing or leakage of the fuel gas and air considerably deteriorates the performance of the fuel cell 1, and there is thus a need for a highly advanced sealing technique to increase the performance of the fuel cell 1.

In the solid oxide fuel cell 1, glass-based sealing materials 40 are generally used to join the separators 30a and 30b and join the unit cell 10 to the separators 30b (In FIG. 1, the air electrode 13 is joined to the upper separator 30b by one of the sealing materials 40).

However, the glass-based sealing materials 40 do not have sufficiently high strength required in the solid oxide fuel cell 1 because they tend to be broken by an external impact. Further, the glass-based sealing materials 40 are readily deformed due to a repeated temperature change, making it difficult to expect sufficient sealing ability. These problems are main causes leading to deterioration in the performance of the solid oxide fuel cell 1.

The current collectors 20 are arranged between the unit cell 10 and the separators 30a and 30b to improve the electrical performance of the fuel cell 1. The current collectors 20 are in the form of a mesh made of a metal alloy or noble metal such that the fuel gas and air are uniformly supplied to the unit cell 10. However, the mesh type structure of the current collectors 20 renders the sealing of the fuel cell 1 more difficult.

To attain a sufficient voltage from the unit cell 10 as an only module, there is a need to increase the area of the unit cell 10 or laminate another unit cell on the unit cell 10 to form a stack. However, the requirements of mechanical strength and sealing performance are more difficult to meet.

SUMMARY OF THE INVENTION

The present invention has been made in view of the above problems, and it is one object of the present invention to provide a metal-supported solid oxide fuel cell in which a metal support having a hollow portion in place of a mesh type current collector can be securely sealed to a separator by direct welding to allow a fuel gas and air to be supplied to a unit cell through respective defined flow passages without being mixed or leakage, achieving sufficient mechanical strength.

Another object of the present invention is to provide a method for manufacturing the metal-supported solid oxide fuel cell.

According to one aspect of the present invention, there is provided a method for manufacturing a metal-supported solid oxide fuel cell, which includes: fixedly joining a metal support to one surface of a unit cell including a fuel electrode, an air electrode and an electrolyte layer interposed between the fuel and air electrodes to fabricate a metal-supported unit cell (S210); fixing a first separator to the surface of the metal support opposite to the surface thereof to which the unit cell is joined (S220); and assembling the first separator to which the metal-supported unit cell is fixed, an insulating member, a first current collecting member and a second separator (S230).

In step S220, the metal-supported unit cell may be coupled to the first separator by welding.

Each of the first and second separators may have a supply passage through which a fuel gas is supplied to the fuel electrode or air is supplied to the electrode, and the first separator may have an inwardly stepped seating portion on which the metal support is seated.

The metal support may be in the form of a plate and may have a welding portion welded to the first separator on the outer circumference thereof and a hollow portion surrounded by the welding portion to allow the fuel gas or air supplied through the supply passage of the first separator to flow into the unit cell and in communication with the supply passage of the first separator to form a flow passage. The hollow portion may be provided in plurality.

In step S210, a joining material may be applied between the metal support and the unit cell, followed by sintering at a temperature of 1,000 to 1,500° C. to join the metal support to the unit cell.

The joining material may be a porous and electrically conductive slurry.

The insulating member may be in the form of a plate having a hollow portion in which the unit cell is positioned and may be disposed between the first and second separators to insulate the separators from each other.

In step S220, a second current collecting member may be fixed between the metal support of the metal-supported unit cell and the first separator.

After step S230, the metal-supported solid oxide fuel cell may be stacked and assembled with one or more metal-supported solid oxide fuel cells, each of which includes a first separator to which a metal-supported unit cell is fixed, an insulating member, a first current collecting member and a second separator disposed in this order. Each of the first separators may be integrated with the second separator positioned adjacent to the first separator.

According to another aspect of the present invention, there is provided a metal-supported solid oxide fuel cell manufactured by the method.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a schematic view of a prior art solid oxide fuel cell;

FIG. 2 is a flow chart illustrating a method for manufacturing a solid oxide fuel cell according to the present invention;

FIG. 6 illustrates some shapes of a separator of a metal-supported solid oxide fuel cell according to the present invention;

DETAILED DESCRIPTION OF THE INVENTION

Exemplary embodiments of the present invention will now be described in detail with reference to the accompanying drawings.

Figure 3:
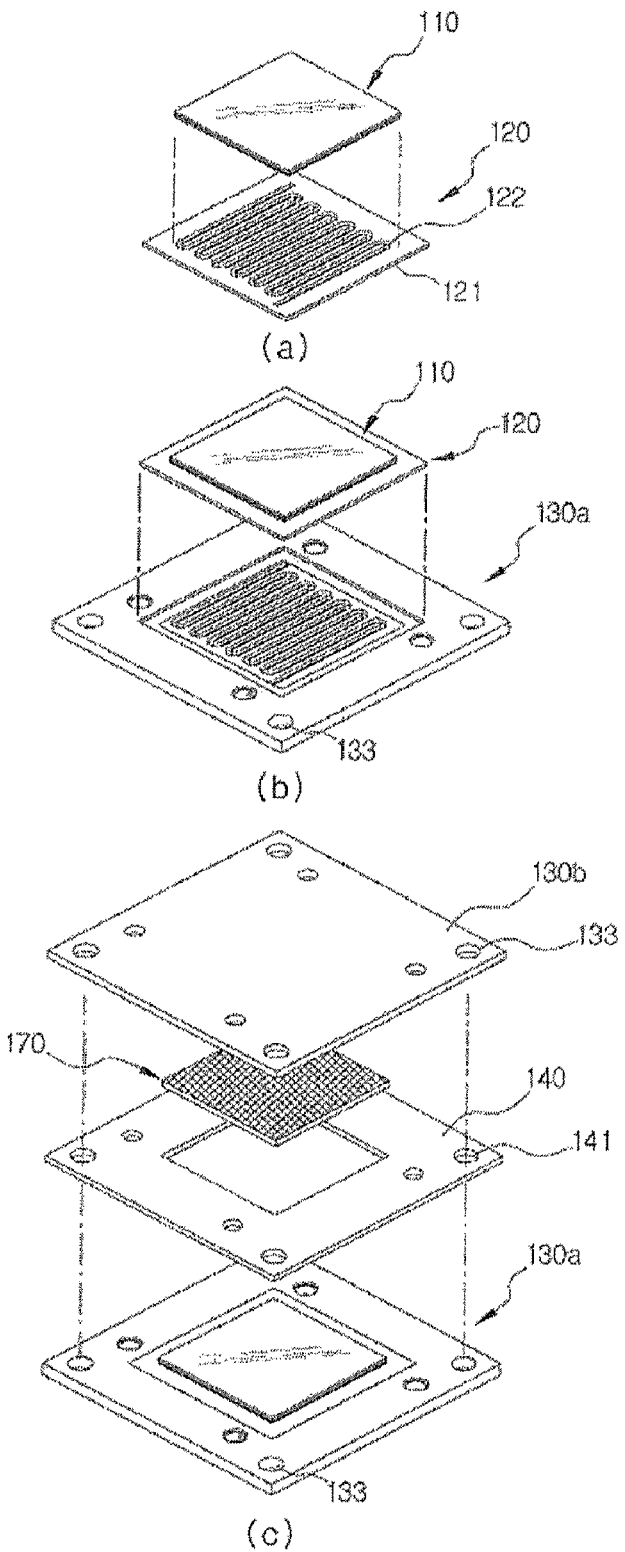
FIG. 3 illustrates the individual steps of the method of FIG. 2.
Figure 4:
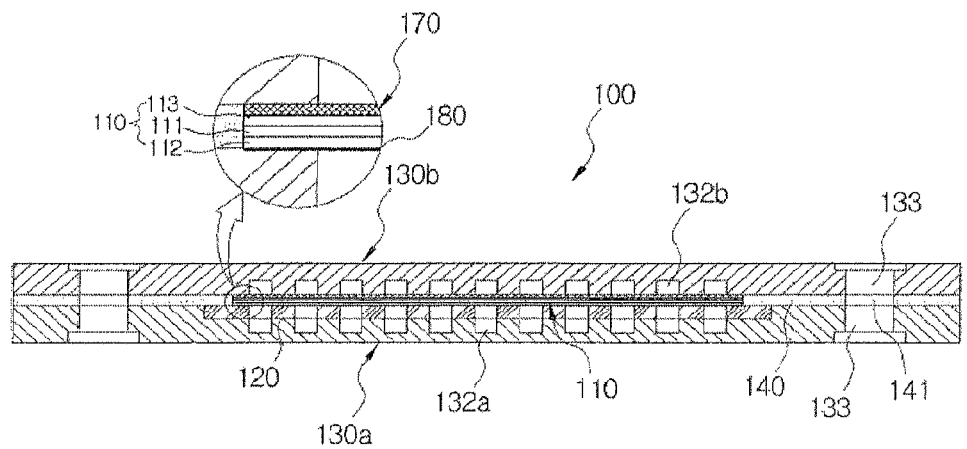
FIGS. 4 and 5 are a cross-sectional view and an exploded cross-sectional view illustrating a metal-supported solid oxide fuel cell according to one embodiment of the present invention, respectively.
Figure 5:
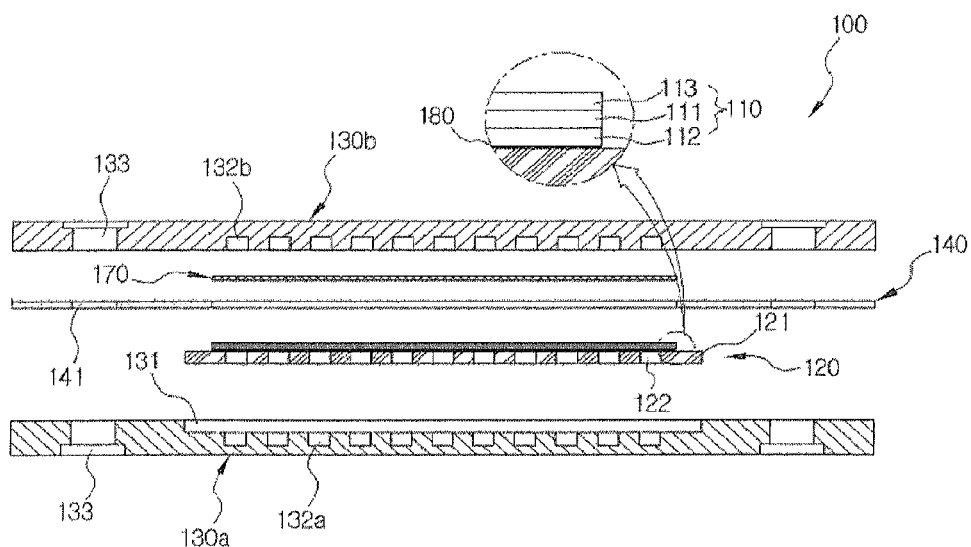
Figure 7:
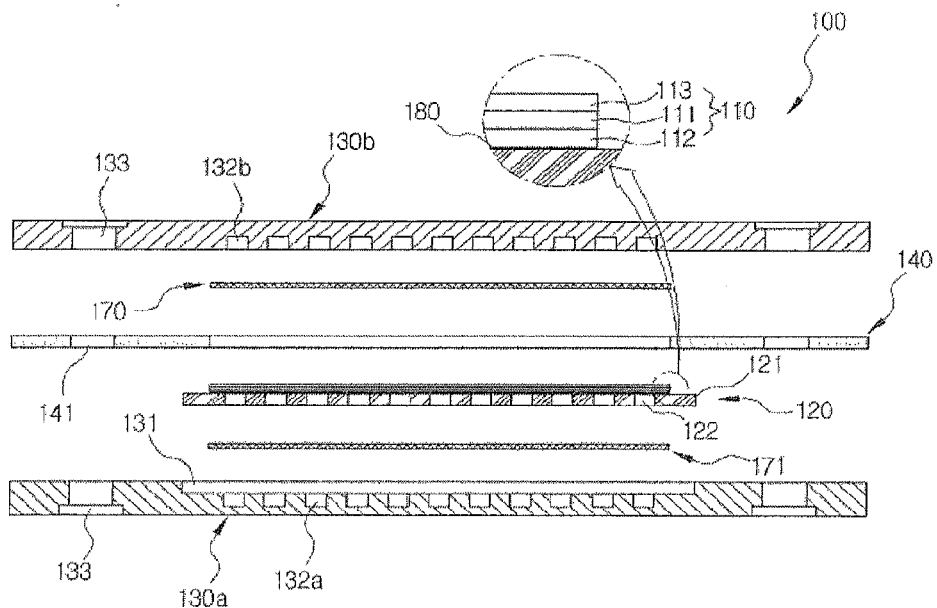
FIGS. 7 and 8 are exploded cross-sectional views of metal-supported solid oxide fuel cells according to embodiments of the present invention.
Figure 8:
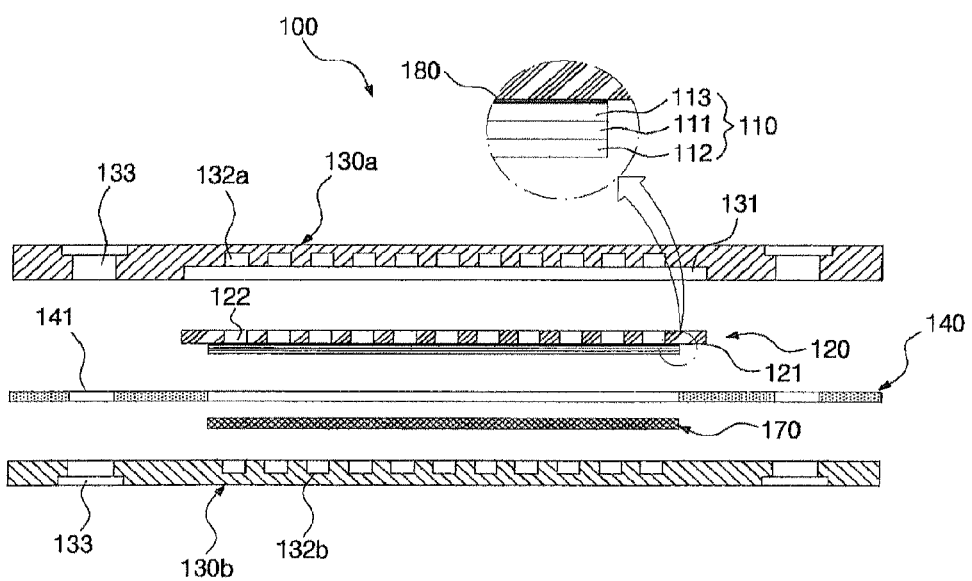
Figure 9:
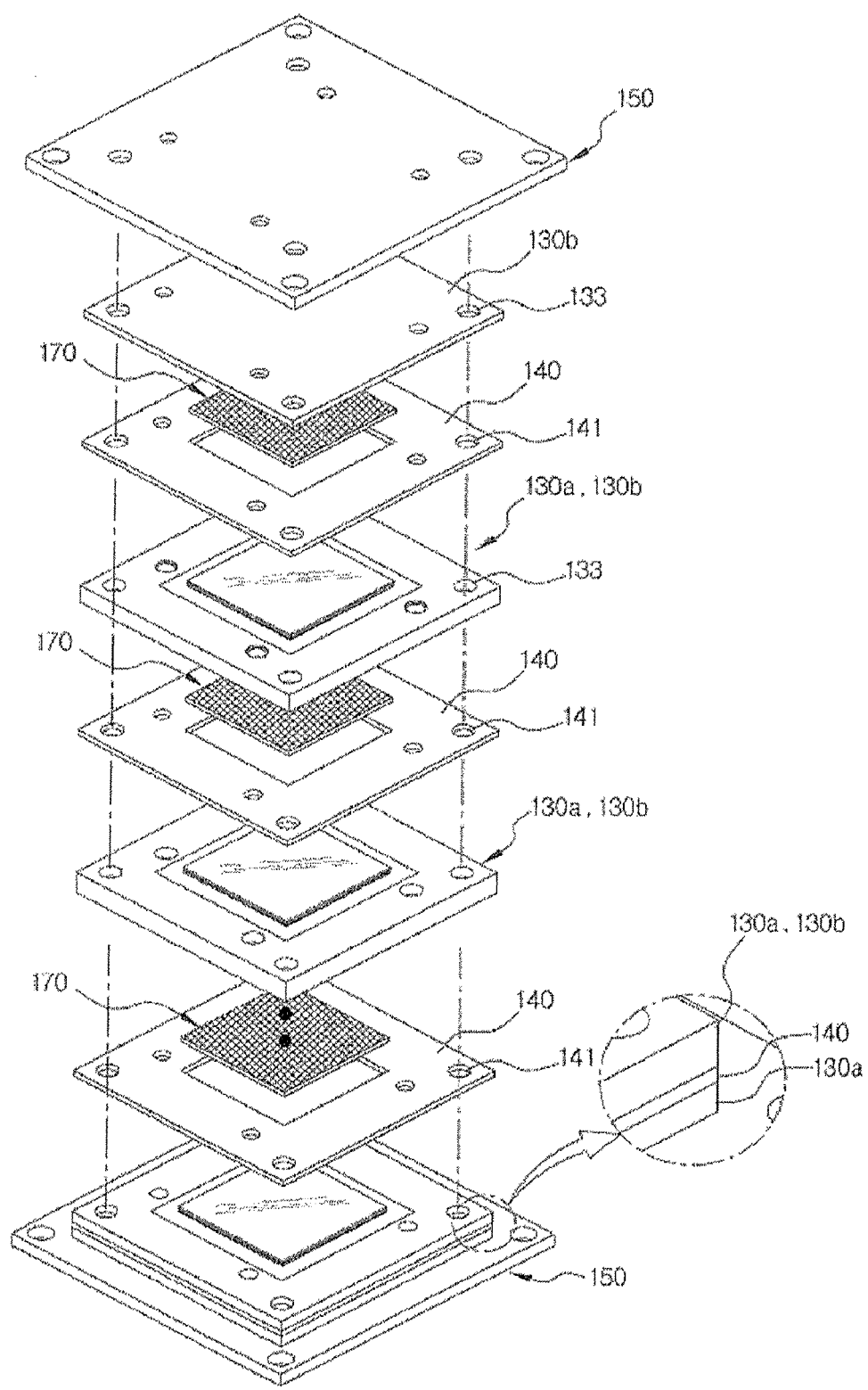
FIG. 9 is an exploded perspective view of a metal-supported solid oxide fuel cell according to another embodiment of the present invention.
Figure 10:
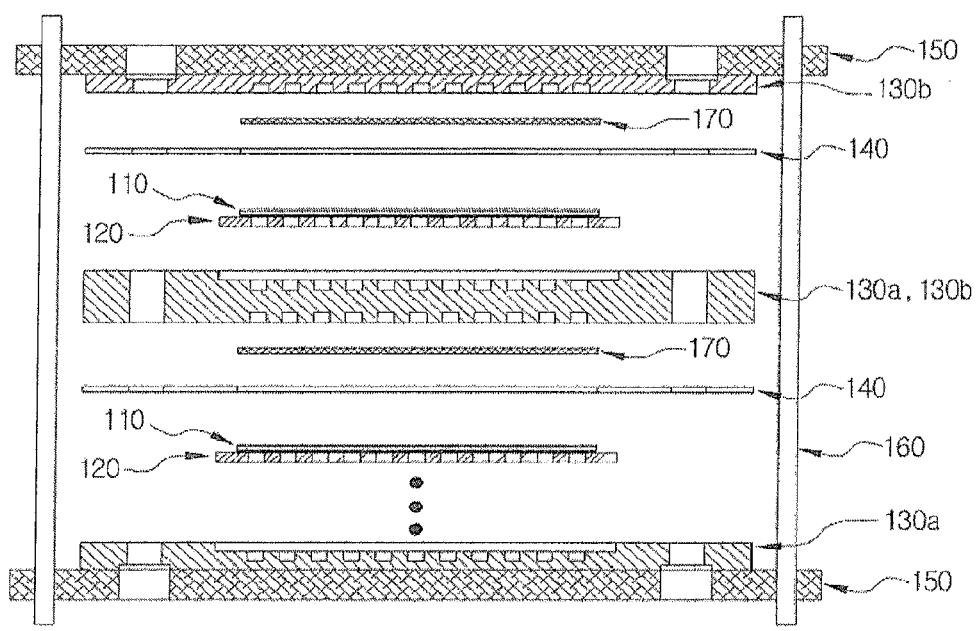
FIG. 10 is a schematic view of a metal-supported solid oxide fuel cell according to another embodiment of the present invention.

FIG. 2 is a flow chart illustrating a method for manufacturing a solid oxide fuel cell 100 according to the present invention, FIG. 3 illustrates the individual steps of the method of FIG. 2, FIGS. 4 and 5 are a cross-sectional view and an exploded cross-sectional view illustrating a metal-supported solid oxide fuel cell 100 according to one embodiment of the present invention, respectively, FIG. 6 illustrates some shapes of a separator of a metal-supported solid oxide fuel cell 100 according to the present invention, FIGS. 7 and 8 are exploded cross-sectional views of metal-supported solid oxide fuel cells 100 according to embodiments of the present invention, FIG. 9 is an exploded perspective view of a metal-supported solid oxide fuel cell 100 according to another embodiment of the present invention, and FIG. 10 is a schematic view of a metal-supported solid oxide fuel cell 100 according to another embodiment of the present invention.

The present invention is directed to a method for manufacturing a metal-supported solid oxide fuel cell 100. As illustrated in FIG. 2, the method of the present invention includes the following steps: fabricating a metal-supported unit cell (S210); fixing the metal-supported unit cell and a first separator 130a (S220); and assembling (S230).

The metal-supported solid oxide fuel cell 100 essentially includes a metal support 120, a second separator 130b and an insulating member 140 in addition to the unit cell 110 and the first separator 130a. Hereinafter, the individual steps of the method and the shapes of the parts constituting the metal-supported solid oxide fuel cell 100 will be explained with reference to the accompanying drawings.

In step S210, the unit cell 110 is fixedly joined to the metal support 120. The unit cell 110 includes a fuel electrode 112, an air electrode 113 and an electrolyte layer 111 interposed between the fuel and air electrodes 112 and 113. The metal support 120 is disposed on one surface of the unit cell 110 to support the unit cell 110 and to increase the current collection efficiency of the fuel cell 100.

The metal support 120 may be made of an electrically conductive material that has mechanical strength and heat resistance sufficient to support the unit cell 110 and withstand welding heat, external impact, etc. without being deformed. Examples of the electrically conductive material include metals and alloys. The metal support 120 may be in the form of a plate having a hollow portion 122 through which a fuel gas or air can flow, and specific shapes of the metal support 120 will be explained later.

FIG. 3a illustrates the step of fabricating the metal-supported unit cell in which the metal support 120 is fixedly joined to one surface of the unit cell 110.

The metal support 120 may be joined to the unit cell 110 by applying a joining material 180 therebetween, followed by sintering. The sintering is preferably performed at a temperature of 1,000 to 1,500° C. In addition to this sintering method of the joining material 180, a physical or chemical method may also be used to join the metal support 120 to the unit cell 110.

A porous and electrically conductive slurry may be used as the joining material 180 to ensure a smooth flow of a fuel gas or air supplied to the unit cell 110 through the metal support 120. A cermet containing a ferrite metal and a small amount of NiO/YSZ may be actually used.

The use of the metal-supported unit cell in the metal-supported solid oxide fuel cell 100 can solve the problems of poor sealing and low current collection efficiency arising from the use of current collectors in the prior art while preventing deformation of the unit cell 110. Other advantages of using the metal-supported unit cell are high mechanical strength and improved durability of the metal-supported solid oxide fuel cell 100.

In step S220, the metal-supported unit cell is fixed to the first separator 130a, as illustrated in FIG. 3b.

The first and second separators 130a and 130b are coupled to each other to accommodate the unit cell 110 therein and support the fuel cell 100. In this embodiment, the metal-supported unit cell is fixed to the first separator 130a.

The metal-supported unit cell may be coupled to the first separator 130a by welding. The term 'welding' as used herein can be broadly interpreted to include brazing as well as all welding processes such as laser welding and argon welding.

The coupling of the metal-supported unit cell and the first separator 130a by welding can further improve the sealing performance of the metal-supported solid oxide fuel cell 100.

The first separator 130a and the second separator 130b serve to support the other constituent parts of the metal-supported solid oxide fuel cell 100. Each of the first and second separators 130a has a supply passage 132a or 132b through which air is supplied to the air electrode 113 of the unit cell 110 or a fuel gas is supplied to the fuel electrode 112 of the unit cell 110.

Depending on whether the metal support 120 is disposed in contact with the air electrode 113 or the fuel electrode 112 of the unit cell 110, a fuel gas or air may flow through either the supply passage 132a of the first separator 130a, to which the metal-supported unit cell is joined, or the supply passage 132b of the second separator 130b, to which the metal-supported unit cell is not joined. In FIG. 4, since the metal support 120 is disposed in contact with the fuel electrode 112, a fuel gas flows through the supply passage 132a of the first separator 130a.

The first separator 130a, to which the metal-supported unit cell is fixed, may have an inwardly stepped seating portion 131 on which the metal-supported unit cell (i.e. the metal support 120) is seated. The seating portion 131 can prevent the metal support 120 from protruding from the upper surface of the first separator 130a when the metal-supported unit cell is fixed to the first separator 130a.

In the case where the seating portion 131 is formed in the first separator 130a and the insulating member 140 disposed between the first and second separators 130a and 130b is in the form of a plate, the insulating member 140 is designed to have the same height as the unit cell 110 for ease of assembly.

Each of the first and second separators 130a and 130b has fixing portions 133. The separators 130a and 130b are coupled to each other by the fixing portions 133. Each of the supply passages 132a and 132b may have holes through which the fuel gas or air is guided from the outside.

The hollow portion 122 of the metal support 120 allows the fuel gas or air to flow into the unit cell 110 to form a flow passage in communication with the supply passage 132a or 132b.

The metal support 120 is in the form of a plate and has a welding portion 121 on the outer circumference thereof to easily couple the metal-supported unit cell to the first separator 130a by welding without impeding the flow of the fuel gas or air.

The supply passage 132a of the first separator 130a may be formed with grooves to have continuous flow passages, as illustrated in FIG. 3, and the first or second separator 130a or 130b may have various shapes, as illustrated in FIG. 6.

A supply passage 132a or 132b formed in a first or second separator 130a or 130b illustrated in FIG. 6a has the same shape as that illustrated in FIG. 3, except that the seating portion 131, on which the metal support 120 of the metal-supported unit cell is seated, is not formed.

A first or second separator 130a or 130b illustrated in FIG. 6b has a plurality of protrusions whose cross section is circular as supply passages 132a or 132b to create a turbulent flow of a fuel gas therein. The first or second separator 130a or 130b illustrated in FIG. 6b has more elongated holes than that illustrated in FIG. 6a.

In step S230, the first separator 130a, to which the metal-supported unit cell is fixed, the insulating member 140, a first current collecting member 170 and the second separator 130b are assembled together to complete the manufacture of the metal-supported solid oxide fuel cell 100 (see FIG. 3c).

As illustrated in FIG. 3c, the insulating member 140 is in the form of a plate having a hollow portion in which the unit cell 110 is positioned to improve the durability and workability of the metal-supported solid oxide fuel cell 100. The insulating member 140 may be a sealing material made of glass with insulating properties. The sealing material as the insulating member 140 is disposed between the first and second separators 130a and 130b before assembly of the separators.

The shape (e.g., height) of the insulating member 140 disposed between the first and second separators 130a and 130b may be varied such that no gaps exist in the metal-supported solid oxide fuel cell 100. When the metal-supported unit cell is seated on the seating portion 131 of the first separator 130a to leave the unit cell 110 protruding from the upper surface of the first separator 130a, the insulating member 140 is preferably designed to have the same height as the overall height of the unit cell 110 and the first current collecting member 170.

The insulating member 140 in the form of a plate has fixing portions 141 at positions thereof corresponding to the fixing portions 133 of the first and second separators 130a and 130b so that the insulating member 140 can be fixed to both the first and second separators 130a and 130b upon assembly.

The first current collecting member 170 is disposed between the second separator 130b, to which the metal support 120 is not joined, and the unit cell 110. The first current collecting member 170 may be made of any porous or mesh type electrically conductive material such that a fuel gas or air supplied through the supply passage 132b of the second separator 130b can smoothly flow into the unit cell 110 (for example, air is supplied to the unit cell 110 because the first current collecting member 170 in contact with the air electrode 113 in the metal-supported solid oxide fuel cell of FIGS. 3 to 5).

The present invention is also directed to a metal-supported solid oxide fuel cell manufactured by the method. FIGS. 4 and 5 illustrate a metal-supported solid oxide fuel cell 100 according to one embodiment of the present invention. As illustrated in FIGS. 4 and 5, a unit cell 110 of the metal-supported solid oxide fuel cell 100 includes a fuel electrode 112, an electrolyte layer 111 and an air electrode 113 disposed in this order from the bottom to the top.

In the metal-supported solid oxide fuel cell 100 as shown in FIGS. 4 and 5, a metal support 120 is disposed in contact with the fuel electrode 112 of the unit cell 110, a first separator 130a having a seating portion 131 is provided under the metal support 120, and a first current collecting member 170 is provided in contact with the air electrode 113 of the unit cell 110.

Due to this construction, when the metal-supported unit cell is fixed to the first separator 130a by welding, a fuel gas or air supplied through the supply passage 132a is supplied to the unit cell 110 only through the hollow portion 122 of the metal support 120. Therefore, the metal-supported solid oxide fuel cell 100 can solve the problems (e.g., low energy production efficiency) of a prior art fuel cell in which a fuel gas or air is supplied through contact portions between a first separator and a metal support (or a current collector or a unit cell) as well as through defined flow passages.

A metal-supported solid oxide fuel cell 100 of FIG. 7 has the same basic constitution as the metal-supported solid oxide fuel cell 100 of FIGS. 4 and 5, except that a second current collecting member 171 is disposed between the metal support 120 of the metal-supported unit cell and the first separator 130a. In step S220, the second current collecting member 171 is positioned between the metal support 120 of the metal-supported unit cell and the first separator 130a before fixing the metal-supported unit cell to the first separator 130a.

In each of the metal-supported solid oxide fuel cells 100 of FIGS. 3, 4, 5 and 7, the metal support 120 is disposed in contact with the fuel electrode 112 of the unit cell 110 and the first separator 130a, to which the metal-supported unit cell is fixed, is disposed under the metal support 120. However, these embodiments do not serve to limit the present invention. For example, FIG. 8 illustrates a metal-supported solid oxide fuel cell 100 in which a metal support 120 is fixedly joined to an air electrode 113 of a unit cell 110 to fabricate a metal-supported unit cell and a first separator 130a is disposed on the metal support 120.

FIGS. 9 and 10 illustrate metal-supported solid oxide fuel cells 100 according to embodiments of the present invention. As illustrated in FIGS. 9 and 10, after the assembly step, the metal-supported solid oxide fuel cell is stacked and coupled with one or more metal-supported solid oxide fuel cells, each of which includes a first separator 130a to which a metal-supported unit cell is fixed, an insulating member 140, a first current collecting member 170 and a second separator 130b disposed in this order from the bottom.

Like the uppermost and lowermost separators 130a and 130b, the intermediate first and second separators 130a and 130b may be independent parts. As illustrated in FIGS. 9 and 10, multiple stacking of the two or more metal-supported solid oxide fuel cells brings the intermediate first separators 130a into contact with the intermediate second separators 130b. Herein, each of the intermediate first separators 130a may be integrated with the second separator 130b positioned adjacent to the first separator 130a. This integration can reduce the number of the constituent parts laminated in the assembly step and the overall size of the metal-supported solid oxide fuel cells 100.

In these embodiments, each of the stacks can be supported by coupling members 160 and end plates 150. Fixing portions 133 of the first separators 130a, fixing portions 133 of the second separators 130b and fixing members 141 of the insulating members 140 are fixed by fixing members (not shown).

As is apparent from the foregoing, in the metal-supported solid oxide fuel cell of the present invention, the metal support having a hollow portion in place of a mesh type current collector can be securely sealed to the first separator by direct welding to allow a fuel gas and air to be supplied to the unit cell through respective defined flow passages without being mixed or leakage. Due to this construction, the metal-supported solid oxide fuel cell of the present invention is stable and has high energy production efficiency. In addition, the metal-supported solid oxide fuel cell of the present invention has sufficient high mechanical strength, resulting in improved durability and extended service life.

Although the present invention has been described herein with reference to the foregoing embodiments, these embodiments do not serve to limit the scope of the present invention. It should be understood that the present invention can be embodied in various different forms and many variations and modifications are possible without departing from the spirit and scope of the invention as defined by the appended claims.

What is claimed is:

1. A method for manufacturing a metal-supported solid oxide fuel cell, comprising:
   fixedly joining a metal support to one surface of a unit cell comprising a fuel electrode, an air electrode and an electrolyte layer interposed between the fuel and air electrodes to fabricate a metal-supported unit cell (S210);
   fixing a first separator to the surface of the metal support opposite to the surface thereof to which the unit cell is joined (S220); and
   assembling the first separator to which the metal-supported unit cell is fixed, an insulating member, a first current collecting member and a second separator (S230).

2. The method of claim 1, wherein in step S220 the metal-supported unit cell is coupled to the first separator by welding.

3. The method of claim 2, wherein each of the first and second separators has a supply passage through which a fuel gas is supplied to the fuel electrode or air is supplied to the electrode, and the first separator has an inwardly stepped seating portion on which the metal support is seated.

4. The method of claim 3, wherein the metal support is in the form of a plate and has a welding portion welded to the first separator on the outer circumference thereof and a hollow portion surrounded by the welding portion to allow the fuel gas or air supplied through the supply passage of the first separator to flow into the unit cell and in communication with the supply passage of the first separator to form a flow passage.

5. The method of claim 4, wherein the hollow portion is provided in plurality.

6. The method of claim 1, wherein in step S210 a joining material is applied between the metal support and the unit cell, followed by sintering to join the metal support to the unit cell.

7. The method of claim 6, wherein the sintering is performed at a temperature of 1,000 to 1,500° C.

8. The method of claim 6, wherein the joining material is a porous and an electrically conductive slurry, which is porous after solidified.

9. The method of claim 1, wherein the insulating member is in the form of a plate having a hollow portion in which the unit cell and the current collecting member are positioned and is disposed between the first and second separators to insulate the separators from each other.

10. The method of claim 1, wherein in step S220 a second current collecting member is fixed between the metal support of the metal-supported unit cell and the first separator.

11. The method of claim 1, wherein after step S230 the metal-supported solid oxide fuel cell is stacked and assembled with one or more metal-supported solid oxide fuel cells, each of which comprises a first separator to which a metal-supported unit cell is fixed, an insulating member, a first current collecting member and a second separator disposed in this order.

12. The method of claim 11, wherein each of the first separators is integrated with the second separator positioned adjacent to the first separator.

* * * * *